Aug. 4, 1970   H. C. RAUSCHENPLAT   3,522,901

END CLOSURE FOR PRESSURE VESSEL

Filed May 28, 1968   3 Sheets-Sheet 1

United States Patent Office 3,522,901
Patented Aug. 4, 1970

3,522,901
END CLOSURE FOR PRESSURE VESSEL
Heinz Carl Rauschenplat, Warren, Pa., assignor to Struthers Wells Corporation, a corporation of Maryland
Filed May 28, 1968, Ser. No. 732,565
Claims priority, application Great Britain, June 27, 1967, 29,624/67
Int. Cl. B65d 53/00
U.S. Cl. 220—46                                    9 Claims

ABSTRACT OF THE DISCLOSURE

An open end pressure vessel as a closure fixed therein with the closure sealed to the pressure vessel by means of a self-energized seal. The closure is held in the pressure vessel by segments having annular projections formed thereon, the segments being urged and locked radially outward so that the annular projections of the segments enter annular grooves formed in the end of the pressure vessel, end thrust on the closure forcing the closure against the segments.

BACKGROUND OF THE INVENTION

Pressure vessels of many types are used in industry which may be from six to ten feet in diameter and contain pressures up to five thousand pounds per square inch. When such vessels are used in applications such as urea reactors, internally located tube bundles must be changed at intervals of about three years. Conventional flanges and pressure vessel heads removably bolted thereon are expensive, add weight to a pressure vessel, and may develop leaks as the bolts holding a head on a flange are under tension.

SUMMARY OF THE INVENTION

This invention provides, in an open end cylindrical pressure vessel, a removable end closure disposed within the end of the pressure vessel, the closure having a central cylindrical portion projecting outward toward the open end of the pressure vessel, the end of the pressure vessel adjacent to the central portion of the closure containing annular grooves, sectors having annular lands thereon, and means urging said sectors outwards from the central portion of said closure holding said lands of said sectors within the annular grooves in said pressure vessel to lock said sectors against longitudinal movement, pressure within said pressure vessel urging said closure against said sectors. This invention further provides a self energized seal comprising a ring adjacent to the inwardly disposed edge of said closure and gaskets about the inner and outer edges of said ring between said ring and said closure, pressure in said pressure vessel forcing said ring outward to compress said inner gasket against said closure and compress said outer gasket against said closure and the wall of said pressure vessel thus forming a seal between said closure and said pressure vessel. Bolts may pass through said closure to initially seat said self energized seal.

The end closure of this invention, to withstand a given pressure in a pressure vessel of a given diameter, weighs less than a conventional flange and externally bolted end closure. Further, it is relatively easy to disassemble and remove when required and will withstand extreme pressure overloads without failure. In addition, with the resulting saving in materials, it is less expensive than a conventional end closure.

DESCRIPTION OF THE PREFERRED EMBODIMENT

Figure 1:
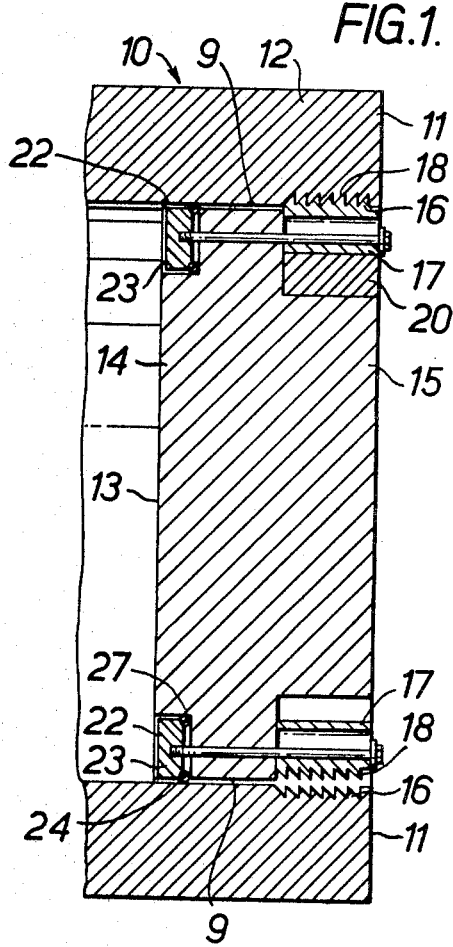
FIG. 1 is a longitudinal vertical section through a broken away end of a pressure vessel and an end closure positioned therein according to this invention.

A cylindrical pressure vessel 10 has a wall 11 within the end 12 of which the closure 13 is to be secured. Closure 13 consists of a disc portion 14 which fits with slight clearance 9 within the end 12. Closure 13 also has a smaller diameter central projection 15 which extends outward within the end 12 of pressure vessel 10. Pressure vessel 10 has annular grooves 16 turned in it adjacent to central projection 15.

Figure 4:
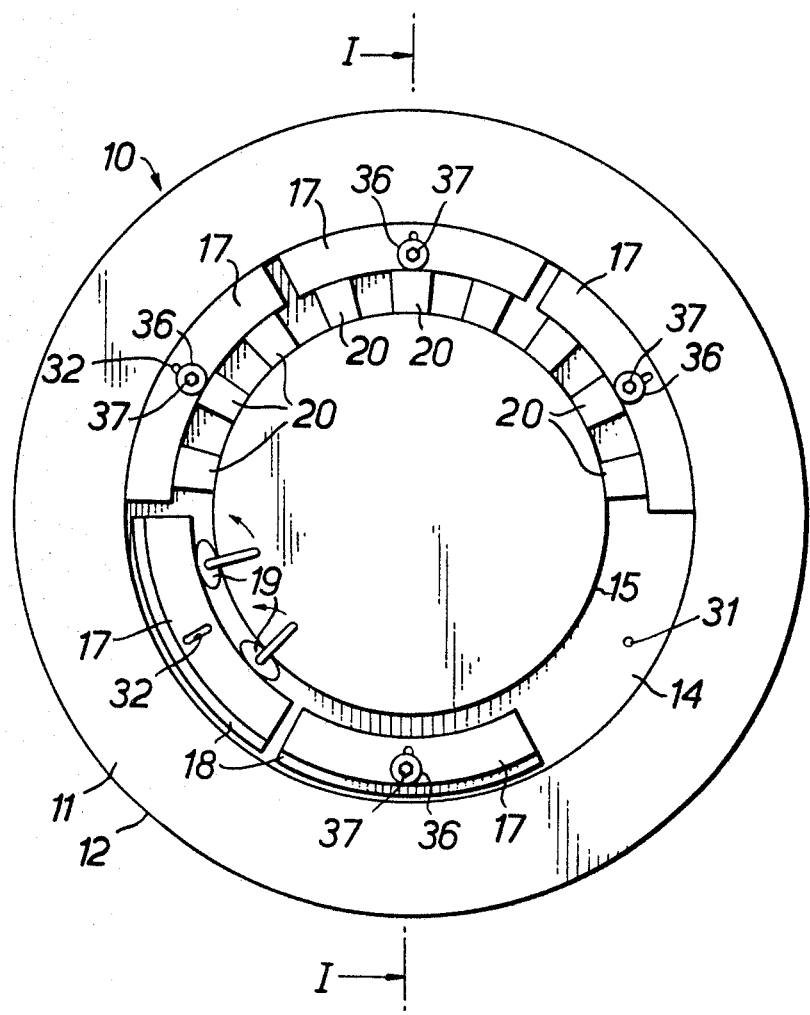
FIG. 4 is an end view of a pressure vessel with a closure being secured therein by means of locking sectors according to this invention.

When closure 13 is positioned within end 12 as shown, it is secured in place by means of the locking sectors 17 which have the lands 18 formed thereon to correspond to the grooves 16 formed in the wall 11 of pressure vessel 10. As shown in FIG. 4, cams 19 may be used to urge the sectors 17 outward from the central projection 15 of closure 13 to seat the lands 18 in the annular grooves 16. When the lands 16 are so seated, inexpensive spacers 20 may be inserted between projection 15 and the sectors 17 to keep the lands 18 engaged in the grooves 16 and prevent any longitudinal motion of the sectors 17. When pressure urges the closure 13 outwards from pressure vessel 10, its disc portion 14 seats on the sectors 17 which firmly secure it in place to contain extreme internal pressures.

Figure 3:
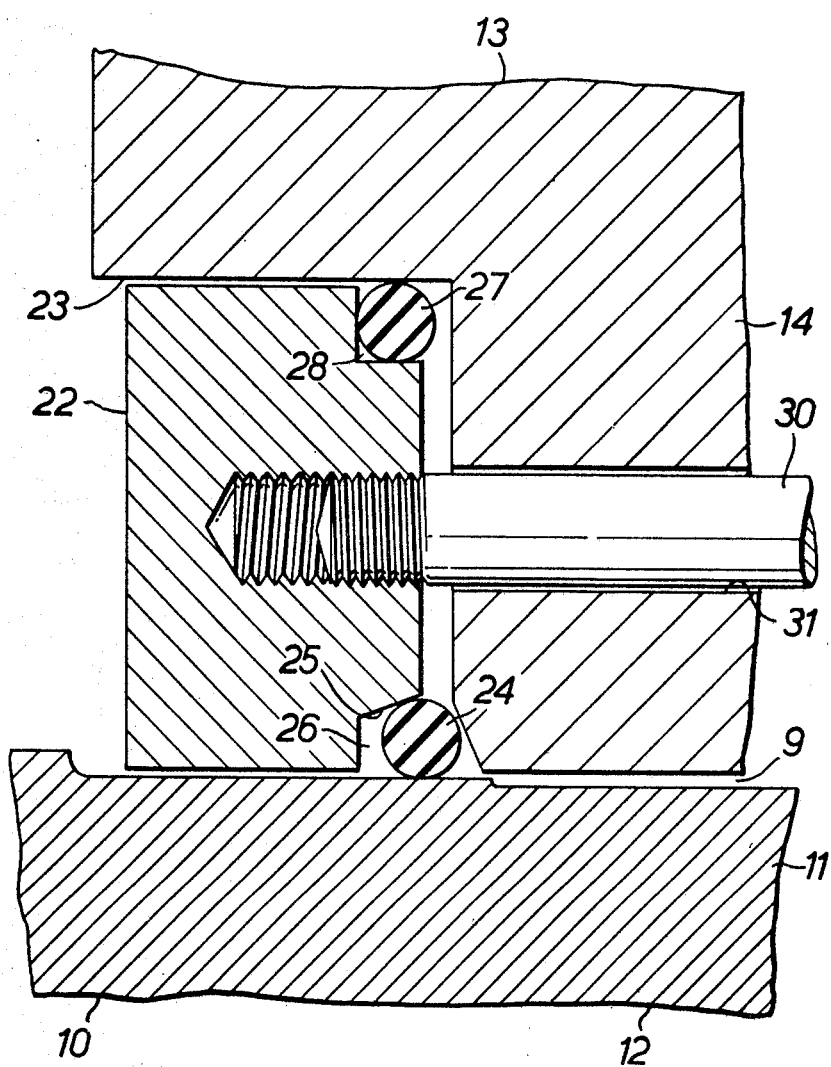
FIG. 3 is a longitudinal vertical section through a fragment of a pressure vessel and an end closure showing details of a self energized seal.

A novel self energizing seal is employed in the practice of this invention. An annular seal ring 22 extends about the inwardly disposed end of the closure 13 in a channel 23. As shown in detail in FIG. 3, an outer gasket 24 is urged longitudinally and radially outward by the sloping face 25 of the outer gasket groove 26. The inner gasket 27 is compressed in inner gasket groove 28 against closure 13.

To initially seal the closure 13, bolts 30 extending through passages 31 in closure 13 and through radial slots 32 in sectors 17, are tightened to draw seal ring 22 longitudinally outward and compress the gaskets 24 and 27. As high pressures build up in pressure vesel 10, the internal pressure urges ring 22 longitudinally outward to further compress gaskets 24 and 27 and maintain a tight seal. The slots 32, as shown in FIG. 4, in the sectors 17 allow them to be moved radially with the bolts 30 loosened and in place. Large washers 36 may be placed under the heads 37 of the bolts 30 to span the slots 32.

Figure 2:
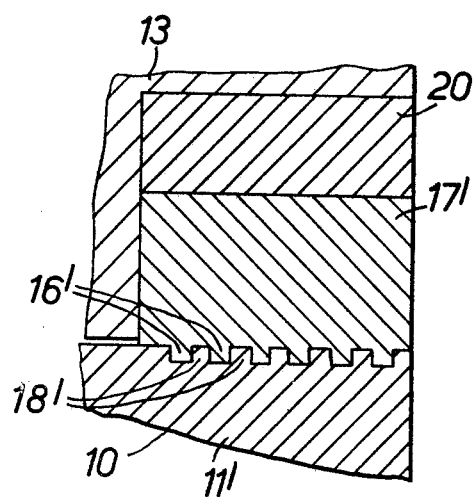
FIG. 2 is a longitudinal vertical section through a fragment of a pressure vessel and a fragment of an end closure secured therein by means of a modified locking sector.

FIG. 2 shows a slight modification of this invention in which annular grooves 16' which are rectangular in section, are cut in the pressure vessel 10. Sectors 17' are then provided with corresponding lands 18' of rectangular section to fit within the grooves 16'. While many sections of lands 18 and grooves 16 could be used, the vertical inward facing surfaces of the grooves 16 and 16' and the vertical outward facing surfaces of the lands 18 and 18' minimize forces that would otherwise tend to urge the sectors 17 inwards as pressures build up behind the closure 13.

While this invention has been shown and described in the best forms known, modifications may be made without departing from the spirit and scope of the invention.

What is claimed is:
1. An end closure of a large diameter, thick walled pressure vessel comprising, in combination,

(a) an open end of said pressure vessel containing annular grooves,
(b) a closure extending with slight clearance into the open end of said pressure vessel beyond said annular grooves, said closure having a smaller central projection extending outward adjacent to said annular grooves leaving a space between said central projection and said grooves,
(c) sectors having annular lands thereon corresponding to said annular grooves and disposed in said annular grooves,
(d) means holding said sectors outward from said central projection locking said lands of said sectors in said grooves, pressure within said pressure vessel urging said closure against said sectors, said sectors securing said closure against outward movement, and
(e) sealing means between said closure and said open end of said pressure vessel blocking flow through said slight clearance.

2. The combination according to claim 1 wherein said grooves have inward facing surfaces substantially normal to the axis of said pressure vessel and said lands have outward facing surfaces substantially normal to the axis of said pressure vessel bearing against the inward facing surfaces of said grooves.

3. The combination according to claim 2 wherein said grooves and said lands are triangular in section.

4. The combination according to claim 2 wherein said grooves and said lands are rectangular in section.

5. The combination according to claim 1 wherein said sealing means between said closure and said pressure vessel blocking flow through said slight clearance comprises a seal ring having radially spaced inner and outer gaskets contacting said closure and said pressure vessel, said seal ring being disposed at the inner side of said closure so that pressure within said pressure vessel forces said seal ring towards said closure compressing said gaskets.

6. The combination according to claim 5 with the addition of bolts extending through said closure between said gaskets turned into the front of said sealing ring, tightening of said bolts initially compressing said gaskets to seal said slight clearance.

7. The combination according to claim 6 wherein said sectors contain radially elongated slots, said bolts passing through said closure and said elongated slots, said elongated slots allowing inward radial movement of said sectors to disengage said lands from said grooves.

8. The combination according to claim 1 wherein said smaller central projection of said closure is cylindrical leaving an annular space of constant width between said projection and said grooves.

9. The combination according to claim 8 wherein said means holding said sectors outward from said central projection are spacers inserted between said central projection and said sectors.

References Cited

UNITED STATES PATENTS

| | | | |
|---|---|---|---|
| 3,144,162 | 8/1964 | Morris | 220—46 |
| 3,144,163 | 8/1964 | Fresche | 220—46 |
| 3,156,375 | 11/1964 | Long | 220—46 |

DAVID M. BOCKENEK, Primary Examiner